US009597744B2

United States Patent
Kadau et al.

(10) Patent No.: US 9,597,744 B2
(45) Date of Patent: Mar. 21, 2017

(54) METHOD FOR UTILIZING A BRAZE MATERIAL WITH CARBON STRUCTURES

(71) Applicant: Siemens Energy, Inc., Orlando, FL (US)

(72) Inventors: Kai Kadau, Clover, SC (US); Michael Clossen-von Lanken Schulz, Issum (DE)

(73) Assignee: SIEMENS ENERGY, INC., Orlando, FL (US)

(*) Notice: Subject to any disclaimer, the term of this patent is extended or adjusted under 35 U.S.C. 154(b) by 260 days.

(21) Appl. No.: 14/076,351

(22) Filed: Nov. 11, 2013

(65) Prior Publication Data

US 2015/0129564 A1 May 14, 2015

(51) Int. Cl.
*B23K 1/19* (2006.01)
*B23K 1/00* (2006.01)
*B23P 6/00* (2006.01)
*F01D 5/00* (2006.01)
*B23K 1/005* (2006.01)
*B23K 1/20* (2006.01)
*B23K 35/36* (2006.01)

(52) U.S. Cl.
CPC ............. *B23K 1/19* (2013.01); *B23K 1/0018* (2013.01); *B23K 1/0056* (2013.01); *B23K 1/20* (2013.01); *B23K 1/203* (2013.01); *B23K 35/36* (2013.01); *B23P 6/002* (2013.01); *F01D 5/005* (2013.01); *B23K 2201/001* (2013.01); *B23K 2203/08* (2013.01); *B23K 2203/14* (2013.01); *B23K 2203/26* (2015.10); *F05D 2230/237* (2013.01); *F05D 2300/607* (2013.01)

(58) Field of Classification Search
CPC ...... B23K 1/19; B23K 1/0018; B23K 1/0056; B23K 1/20; B23K 1/203; B23K 35/36; B23K 2201/001; B23K 2203/08; B23K 2203/18; B23P 6/002; F01D 5/005

USPC ..... 219/121.6, 121.66, 121.85, 85.12, 85.13, 219/85.15, 85.22; 228/180.1–180.22, 228/245–262; 977/707, 722, 734, 742
See application file for complete search history.

(56) References Cited

U.S. PATENT DOCUMENTS 5,666,643 A * 9/1997 Chesnes ............. B23K 35/0222
148/528
5,902,498 A 5/1999 Mistry et al.
(Continued)

OTHER PUBLICATIONS

Wu, et al., Vacuum brazing of carbon nanotube bundles, Materials Letters 62 (2008) 4486-4488.
Huang, et al., Wetting and the reaction of multiwalled carbon nanotube-reinforced composite solder with a copper substrate, Science of Engineering of Composite Materials. Volume 0, Issue 0, pp. 1-6, ISSN (Online) 2191-0359, ISSN (Print) 0792-1233. DOI: 10.1515/secm, Apr. 2013 (Abstract).
(Continued)

*Primary Examiner* — David Angwin
*Assistant Examiner* — Justin Dodson

(57) ABSTRACT

A method of brazing including melting a surface region (26) of a substrate (12, 14, 22) and contacting a braze material (10) with the melted surface region, the braze material including a plurality of braze fillers (16) and a plurality of carbon structures (18). The method further includes subjecting the braze material to an amount of energy effective to melt the braze fillers but not the carbon structures, and cooling the braze material to form a brazement (28, 32) including the carbon structures within at least a portion of the substrate. The brazement includes a gradient (30) of the carbon structures, wherein a concentration of the carbon structures increases in a direction away from an interior of the substrate.

19 Claims, 3 Drawing Sheets

(56) References Cited

U.S. PATENT DOCUMENTS

| | | | |
|---|---|---|---|
| 6,982,212 B2* | 1/2006 | Stolk | H01L 21/26513 257/E21.324 |
| 7,326,892 B1* | 2/2008 | Cretegny | B23K 1/005 219/615 |
| 7,416,108 B2 | 8/2008 | Philip | |
| 7,946,467 B2 | 5/2011 | Cretegny | |
| 8,342,386 B2 | 1/2013 | Cretegny et al. | |
| 2006/0162817 A1 | 7/2006 | Boger et al. | |
| 2008/0170982 A1* | 7/2008 | Zhang | B82Y 10/00 423/447.3 |
| 2008/0290137 A1* | 11/2008 | Budinger | B23K 1/0018 228/119 |
| 2010/0126631 A1 | 5/2010 | Suh | |
| 2010/0193574 A1 | 8/2010 | Cretegny et al. | |
| 2012/0111928 A1* | 5/2012 | Park | B23K 1/0018 228/245 |
| 2013/0001278 A1 | 1/2013 | Cretegny et al. | |
| 2013/0270233 A1* | 10/2013 | Gu | B23K 26/203 219/121.64 |

OTHER PUBLICATIONS

Fattahi M. et al; "A new technique for the strengthening of aluminum tungsten inert gas weld metals: Using carbon nanotube/aluminum composite as a filler metal"; Micron; vol. 54-55; pp. 28-35: URL:http://www.sciencedirect.com/science/article/pii/50968432813001066; DOI: doi:I0.1016/j.micron.2013.07.004; XP002736608.

Mingguang Z. et al; "Improving the strength of brazed joints to alumina by adding carbon fibres"; Journal of Materials Science; vol. 32; No. 20; pp. 5321-5333; URL: http://rd.springer.com/articie/10.1023/A:1018666827969; ISSN: 1573-4803; DOI: 10.1023/A:1018666827969; XP002736609.

Shiue R. K. et al; "Infrared brazing of TiAl using Al-based braze alloys"; Intermetallics; vol. 11; No. 7; pp. 661-671; URL: http://www.sciencedirect.com/science/article/pii/S0966979503000773; DOI:10.1016/S0966-9795(03) 00077-3; XP002736610.

* cited by examiner

METHOD FOR UTILIZING A BRAZE MATERIAL WITH CARBON STRUCTURES

FIELD OF THE INVENTION

The present invention relates to the field of metallurgy, and more specifically to methods for the enhancement of a substrate or the joining of substrates, such as superalloy and titanium-based substrates, utilizing a braze material comprising carbon structures.

BACKGROUND OF THE INVENTION

Gas turbines are well-known in the art. It is an ongoing quest within the gas turbine field to increase the thermal efficiency of the gas turbine cycle. One way this has been accomplished is via the development of increasingly temperature-resistant materials, or materials that are able to maintain their structural integrity over time at high temperatures. For example, single crystal (SX) alloys have been developed that are able to withstand higher working temperatures. This is believed to be due, in part, to the fact that single crystal structures have the ability to withstand creep at higher temperatures than polycrystalline turbine blades due to the lack of grain boundaries. Grain boundaries are an area of the microstructure where a number of defects and failure mechanisms start that may lead to the occurrence of creep. The lack of these grain boundaries in directionally solidified single crystal materials, for example, reduces the likelihood of creep.

Brazing is a method commonly used to coat, repair, add buildup to, or join components, such as superalloy components. Typically, brazing involves melting a braze material at a temperature less than a liquidous temperature of the base component and allowing the material to solidify to become integral with the base component. One limitation of brazing is that the final brazed material (hereinafter "brazement") is typically much weaker than the component being brazed. Thus, brazing may not be fully beneficial in all situations, such as repairs to the most highly stressed areas of a component. This issue is heightened with the enhancement (e.g., coating, repair, or buildup) and joinder of SX materials, for example. When polycrystalline superalloys are used as the braze material to enhance or join SX materials, the brazement will typically not crystallize in the same orientation as the base SX component. This results in a brazement that is weaker than the base component. Further, the use of SX materials in a braze material to join or repair SX materials is problematic because such a brazing process is highly intensive and requires extremely tight process controls.

In addition to SX materials, titanium-based materials, such as TiAl materials, are also becoming increasingly used in gas turbines, particularly with low pressure blades of the turbine. The Ti material is typically half as dense as comparable Ni-based alloy materials yet exhibits excellent temperature stability and corrosion-resistance. However, with Ti-based materials, enhancement or joinder by brazing also becomes very challenging due to brittle contact between the surfaces of the braze material and the titanium-based component. Generally, the brittleness of a Ti-based substrate renders it difficult for a strong interface to be formed between the braze material and the Ti-based substrate.

Moreover, despite the improved thermal properties of the above-discussed materials, the gas turbine environment is notably harsh. Thus, damage and deterioration of the components of the gas turbine still occur. For example, the surface of a component may become cracked due to thermal cycling or thermo-mechanical fatigue, or the component may erode as a result of impacts with foreign objects and corrosive fluids. Furthermore, such components may even be damaged during manufacturing operations prior to entering service. Because the cost of gas turbine components continues to be relatively high, repair of a damaged or degraded component is preferred over replacement of the component. New techniques for improving the repair and enhancement of these improved materials are thus needed.

BRIEF DESCRIPTION OF THE DRAWINGS

The invention is explained in the following description in view of the drawings that show.

DETAILED DESCRIPTION OF THE INVENTION

The present inventors have developed a novel braze material and associated methods that provide an improved solution for the enhancement (e.g., coating, repair, or buildup) of a substrate, or the joinder of substrates. The materials and methods may be utilized with both metallic and non-metallic substrates, including titanium-based materials and directionally solidified (DX) superalloys such as single crystal (SX) superalloys. Because the materials and methods described herein may be utilized with various types of materials, only one joining method needs to be validated for a number of different substrate materials. This results in significant savings of time and expense. In addition, the materials and methods described herein advantageously utilize carbon structures in the braze material. The carbon structures do not melt during brazing, and thus provide a structural network that improves the strength and stability of the final brazement, particularly at the interface between the braze material and the substrate.

Figure 1:
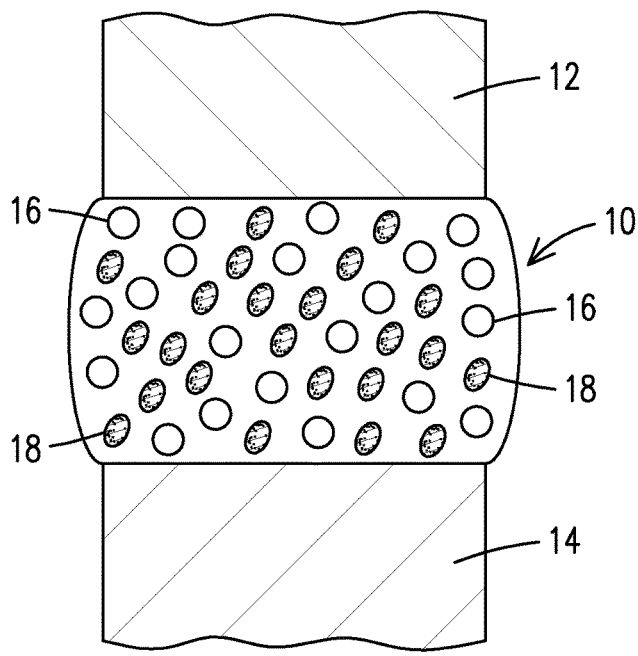
FIG. 1 illustrates a cross-sectional view of a braze material comprising carbon structures disposed between two substrates in accordance with an aspect of the present invention.
Figure 2:
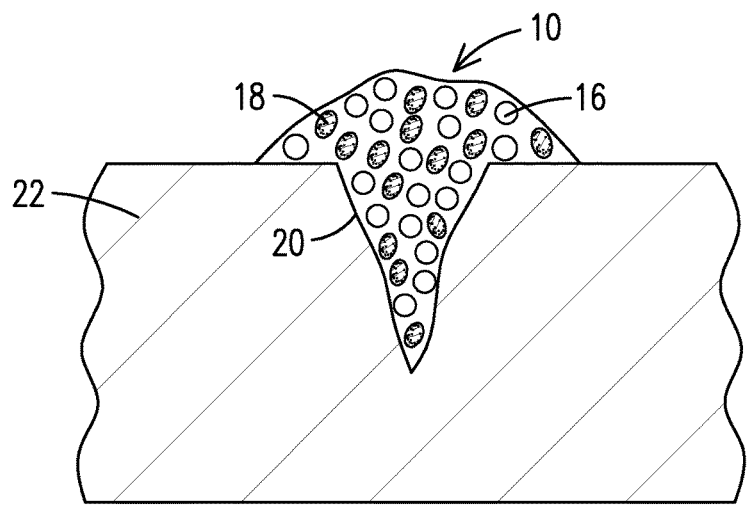
FIG. 2 illustrates a cross-sectional view of a braze material comprising carbon structures filling a defect in a substrate in accordance with an aspect of the present invention.

Referring to FIG. 1, there is shown an improved braze material 10 disposed between and contacting surfaces of two substrates 12, 14 to be joined by the braze material 10. In the embodiment shown, the braze material 10 comprises a plurality of filler particles of a base material 16 (hereinafter braze fillers 16). In addition, the braze material 10 comprises a plurality of carbon structures 18 as will be described in detail below. FIG. 2 illustrates another application of a braze material 10 as described herein. As shown, the braze material 10 is shown filling in a defect 20, e.g., a crack, in a base substrate 22.

The base substrate (e.g., any one or more of substrates 12, 14 or 22) for use in the present invention is without limitation. In certain embodiments, the base substrate comprises a titanium-based component, such as a titanium aluminide (TiAl)-based material or a titanium steel alloy. In an embodiment, the TiAl is gamma-TiAl. In another embodiment, the base substrate comprises an alloy material, such as a superalloy material. Superalloys typically refer to alloys that exhibit excellent mechanical strength and high resistance to creep at high temperatures (e.g., >1000° C.). In addition, superalloys typically have excellent surface stability, corrosion resistance, and oxidation resistance. In one embodiment, the superalloy comprises one or more of nickel, cobalt, or nickel-iron as a base alloying element of the superalloy. In certain embodiments, the superalloy material comprises a directionally solidified (DX) alloy such as a single crystal (SX) superalloy. Exemplary superalloys include but are not limited to Hastelloy, Inconel (e.g., IN100, IN600, IN713), Waspaloy, Rene alloys (e.g., Rene 41, Rene 80, Rene 95, Rene N5), Haynes alloys, Incoloy, MP98T, TMS alloys, and CMSX (e.g., CMSX-4) single crystal alloys. Generally, the base substrate may comprise any material with which would benefit from a joining technique, such as a brazing or welding technique.

The braze fillers 16 may have a composition similar to that of the base substrate, such as a superalloy with a composition similar to that of the base substrate. In this way, the braze fillers 16 are metallurgically compatible or otherwise compatible with the base substrate. In certain embodiments, the braze fillers 16 are suspended within a carrier (not shown). The materials selected for the brazing material 10, base substrate(s), braze fillers 16, and/or any solvents/carriers may have a chemical composition as is known in the art of the enhancing or joining components. Other material selections for the braze fillers 16 may be made depending upon the requirements of the particular application.

The braze material 10 further comprises a plurality of carbon structures 18 that add significant structural and thermal stability to the enhancement or joinder site. Thus, for example, in the case of the repair of single crystal components, upon completion of the brazing process, the braze material 10 (now in the form of a brazement) comprising carbon structures 18 has a markedly improved structural stability compared to prior art polycrystalline braze materials due to a network of carbon structures 18 being distributed throughout the braze material 10. In certain embodiments, the distribution of carbon structures 18 is substantially homogenous. In other embodiments, the distribution of carbon structures 18 is non-homogenous, which may further increase the mechanical strength of the braze material 10 upon melting/cooling. In addition, the presence of the carbon structures 18 in a braze material 10 improves the enhancement of or joinder of titanium-based materials as the carbon structures 18 also stabilize the interface between the titanium-based substrate and the braze material 10.

In an embodiment, the carbon structures 18 comprise one or more fullerene structures. Fullerenes are molecules of varying sizes composed entirely of carbon, which take the form of a hollow sphere, ellipsoid, or tube. In a particular embodiment, the carbon structures 18 comprise a carbon nanotube from the fullerene structure family. Carbon nanotubes are known to have extraordinary mechanical strength and high melting points of up to 3000° C. In certain embodiments, the carbon nanotubes are cylindrical-shaped, and at least one end is capped with a hemisphere of the buckyball structure. The carbon nanotubes may be single-wall or multi-wall nanotubes dispersed within, embedded in, or otherwise included with the braze material 10. The nanotubes may be produced utilizing any known procedure known in the art, including but not limited to a carbon-arc process, electric arc discharge, laser vaporization, laser ablation, or a deposition process, such as chemical vapor deposition (CVP).

In another embodiment, the carbon structures 18 comprise a carbon nanoyarn, such as a highly-twisted double-helix carbon nanotube yarn as described in ACS Nano, 2013, 7 (2), pp 1446-1453. Recently, researchers found that carbon nanotubes can be self-assembled into a stable double-helix structure by a controlled over-twisting process. This carbon structure provides increased elasticity relative to other carbon nanoyarns. Advantageously, nanoyarns provide a longer network of reinforcing carbon structures relative to individual particles alone when additional reinforcement is desired.

In yet another embodiment, the carbon structures 18 comprise carbon nanobuds. Carbon nanobuds are another allotrope of carbon, wherein fullerene-like "buds" are covalently attached to the outer sidewalls of corresponding carbon nanotubes. In a particular embodiment, the carbon structures 18 comprise cylindrical-shaped carbon nanotubes having one or more spherical carbon structures attached thereto to form the carbon nanobud structures.

In still another embodiment, the carbon structures 18 may comprise graphene structures. Graphene is also an allotrope of carbon, wherein carbon atoms are arranged in a regular hexagonal pattern. Typically, graphene is a one-atom thick layer of the mineral graphite. In still another embodiment, the carbon structures 18 comprise a diamond-like material, such as particles having a diamond like coating thereon, e.g., silicon (Si) particles coated with a diamond like coating as are known in the art.

The carbon structures 18 may comprise a relatively uniform size distribution or may comprise a mixture of different sized carbon structures of the same or different materials. In an embodiment, the carbon structures comprise first carbon structures of a first dimension and second carbon structures of a second dimension smaller than the first dimension. For example, the carbon structures 18 may comprise a mixture of carbon nanotubes and graphene structures, or a mixture of carbon nanotubes and nanoyarns. The different-sized carbon structures stabilize the braze material 10 on different scales and against different damage mechanisms. In an embodiment having a mixture of small and large carbon structures, the small carbon structures have a largest dimension of 1 micron or less and the large carbon structures have a largest dimension greater than 1 micron. In an embodiment having a relatively uniform size distribution, the carbon structures 18 may comprise carbon nanotubes having a longest dimension from 10 nm to 30 μm, and in a particular embodiment, from 100 nm to 10 μm, for example.

The carbon structures 18 may be provided in any suitable amount in the braze material 10 to provide the desired structural performance of the braze material 10. In an embodiment, the carbon structures 18 are provided in a weight percentage (wt %) of 0.01-90 wt %, and in particular embodiments, 0.01 to 5 wt % of the braze material 10.

Figure 3:
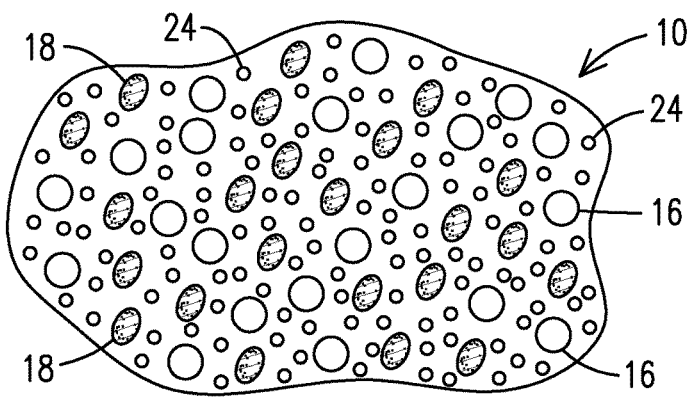
FIG. 3 illustrates a cross-sectional view of a braze material comprising carbon structures and nanostructures in accordance with an aspect of the present invention.

The braze material 10 may also comprise further additives, such as melting point reducers, as are known in the art. In an embodiment, as shown in FIG. 3, the braze material 10 does not contain any melting point reducers, but rather comprises a plurality of nanosized particles 24 that may be similar to or the same composition as the braze fillers 16. As described in U.S. Pat. No. 7,416,108, for example, the inventor recognized the advantage of utilizing nanosized particles in a braze material mix in order to eliminate or reduce the amount of melting point depressants necessary to achieve a desired melting temperature. The disclosure of U.S. Pat. No. 7,416,108 is hereby incorporated by reference in its entirety. In certain embodiments, from 1-100% by volume (vol. %) of the braze fillers 16 may be nanosized. As used herein, the term "nanosized," is meant to refer to a particle having a longest dimension of 1000 nanometers or less.

In addition, it is appreciated that the braze material 10 may be in any desired form such as a powder, slurry, paste, tape, or the like as is known in the art. Further, the particles of the braze material 10 may be provided in dry or in an emulsion or dispersion using solvent/carriers such as deionized water, organic solvents (e.g., ethanol and propanol), inorganic solvents (e.g., HCl), and the like. When in a powder or slurry form, the braze material 10 may be combined with a suitable binder/carrier, such as "s-gel," commercially available from the Wall Comonoy Corp. It is also understood that while the term "braze material" is used herein, the use of the braze material is not limited to brazing processes, but may be utilized in other joining techniques, such as welding or the like.

In certain embodiments, prior to brazing, it may be desirable to melt a relatively thin portion of the surface layer of the substrate(s) (e.g., 12, 14, 22) at or about the site on the substrate(s) to be joined or enhanced. In a conventional brazing process, it is typically preferred not to melt a surface of the target substrate as doing so is typically thought to actually increase the amount and/or area of damaged material. However, in an embodiment, against conventional wisdom, a surface layer of a substrate may be melted prior to or during brazing to increase the size of and/or strengthen the interface between the braze material 10 and the base substrate as set forth below. As such, the term "brazing" as used herein refers not only to techniques where the braze material is melted at a temperature less than a liquidous temperature of the base component so that the base component is not melted, but also techniques under which a portion or layer of the base substrate may liquefied or melted to an extent.

Figure 4A:
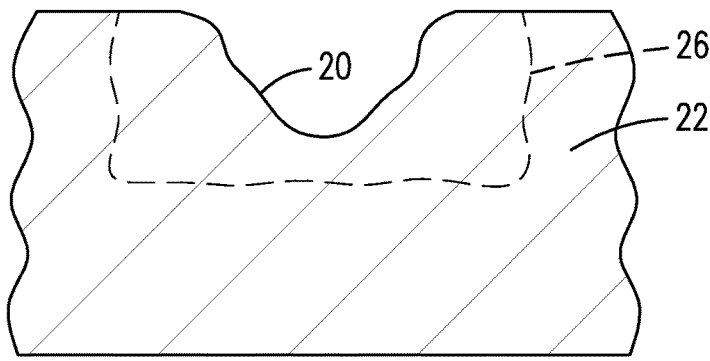
FIGS. 4A-4B illustrate the repair of a defect in a substrate with the melting of a surface substrate region in accordance with an aspect of the present invention.
Figure 4B:
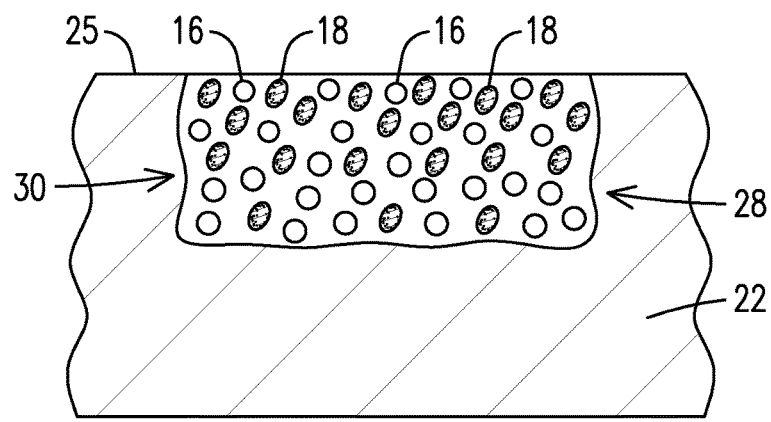

Referring to FIGS. 4A-4B, for example, there is shown a substrate 12 having a defect 20 therein. In this embodiment, a surface region (shown by dotted lines 26) of the substrate 22 is melted prior or during brazing as shown in FIG. 4A. When the braze material 10 is then contacted with the melted surface region 26 and is subjected to the application of energy as described herein during brazing, at least some of the carbon-structures 18 in the reinforced material will be distributed throughout the resulting molten material of melted surface region 26. Upon cooling and solidification, as shown in FIG. 4B, the resulting brazement 28 (comprising material from both the substrate 22 and the braze material 10) will include reinforcing carbon structures 18 which penetrate into an interior of the substrate 22.

In certain embodiments, as shown in FIG. 4B, the network of carbon structures 18 form a gradient 30 of carbon structures 18 dispersed throughout the brazement 28 such that a concentration (e.g., volume percentage (vol. %) and/or density (number of carbon nanotubes per unit of area)) of carbon structures 18 increases in a direction away from an interior of the substrate 22 (e.g., from an interior of the substrate toward a surface 25 of the substrate 22 or brazement 28). In an embodiment, the brazement 28 comprises the material of the melted surface region 26 and the braze material 10, particularly at greater depths of the brazement. When cooled and solidified, the gradient 30 provides a more gradual interface between a braze material 10 and a substrate relative to the abrupt interface typically found between a braze material 10 and a substrate, which improves the stability of the overall brazed structure. Moreover, the overall brazed area will be mechanically stronger since the carbon structures 18 may be distributed such that they are disposed in greater concentrations where increased mechanical strength is most needed (e.g., a region consisting essentially of the braze material 10) and may be disposed in lesser quantities where structural support is less needed (e.g., where material primarily consists of the substrate material). In this way, even if the integrity of the substrate at the melted substrate region 26 is slightly compromised due to the melting, the presence of the carbon structures 18 in lesser concentrations still aids in stabilizing and/or strengthening the structure of the melted substrate region 26.

As an example, when a surface layer 26 of a single crystal material is melted and mixed with the molten braze material 10, the crystalline structure of the single crystal material may be disturbed even with small quantities of the braze material 10 mixed therein. However, while the crystalline structure may be disturbed to a degree in the melted surface region 26, the presence of the carbon structures 18 are sufficient to stabilize the region. Moreover, any disturbance in the substrate structure is believed to be outweighed by the benefit of providing a more gradual interface between the braze material 10 and the substrate(s). Titanium-based materials also benefit greatly from the above-described interface as an abrupt interface between the brittle titanium-based material and a braze material is avoided.

In an embodiment, the melting of the substrate surface region 26 is done utilizing laser techniques to control the depth of the melted surface region 26. Alternatively, the melting of the substrate surface region 26 may be done by any other method comprising the application of energy as is known in the art. As shown in FIGS. 4A-4B, the melted surface region 26 has a greater depth than the defect 20. It is understood that the present invention, however, is not so limited and that the surface region 26 may have an equal or shallower depth that the defect 20 if desired.

Figure 5A:
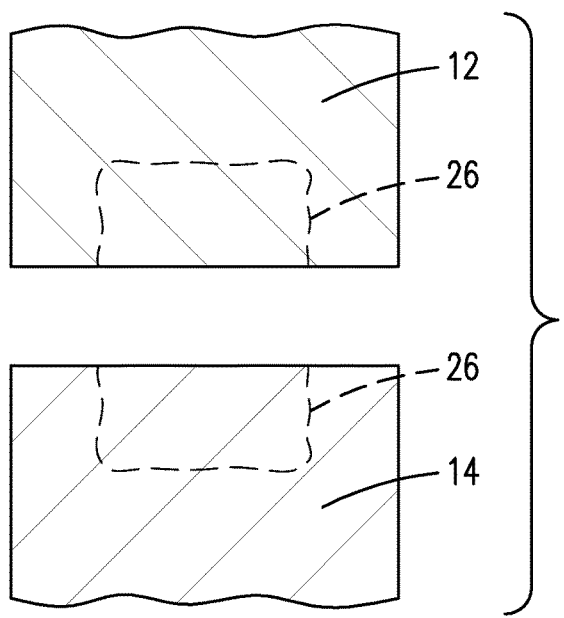
FIGS. 5A-5B illustrate the joinder of two substrate with the melting of surface substrate regions in accordance with an aspect of the present invention.
Figure 5B:
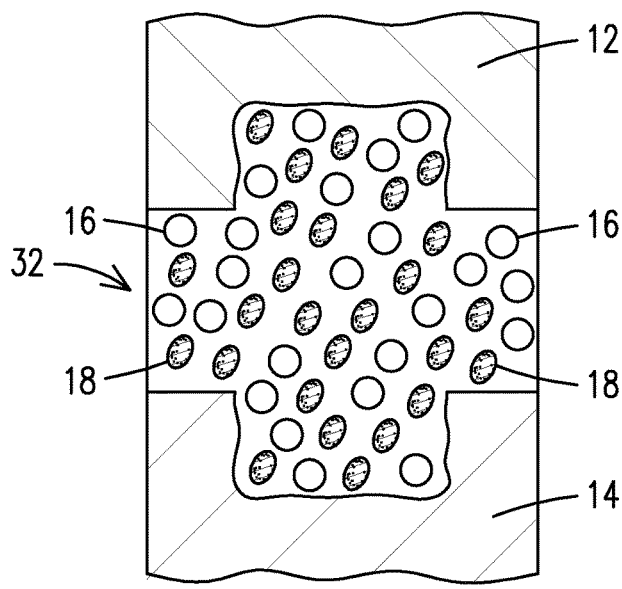

FIGS. 4A-4B illustrated the case where a defect 20 is present in the substrate 22. It is understood that the same principles for melting a portion of the surface layer of the substrate described above may be applied to the joinder of two substrates. As shown in FIG. 5A, substrates 12, 14 may both have a surface region (shown by dotted lines 26) that is melted prior or during brazing as shown in FIG. 5A. As shown in FIG. 5B, after undergoing a brazing technique utilizing the braze material 10 as described herein, the braze material 10 is cooled to form a brazement 32 comprising the carbon structures within at least a portion of the substrates 12, 14, which may be a single crystal or titanium-based substrate, for example. The resulting brazement 32 will provide an enhanced interface between the two substrates due to the penetration of the brazement 32 into an interior of the substrates 12, 14, and also will provide increased strength due to the presence of the carbon structures 18 in the brazement 32. In certain embodiments, the brazement 32 comprises a gradient 30 of carbon structures 18 (not shown in FIG. 5B) as described above such that the carbon structures 18 are disposed in greater concentrations where increased mechanical strength is most needed and are disposed in lesser quantities where structural support is less needed (toward the interior of the substrates 12 and 14).

Figure 6A:
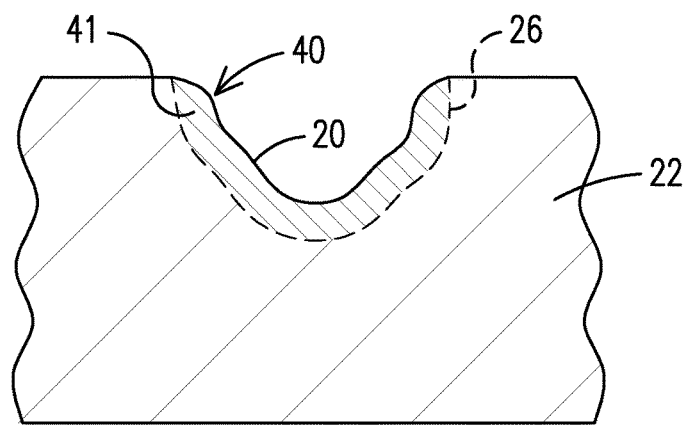
FIGS. 6A-6B illustrate the melting of a substrate surface layer that follows a contour of a natural defect surface of the substrate and the resulting final braze structure in accordance with an aspect of the present invention.
Figure 6B:
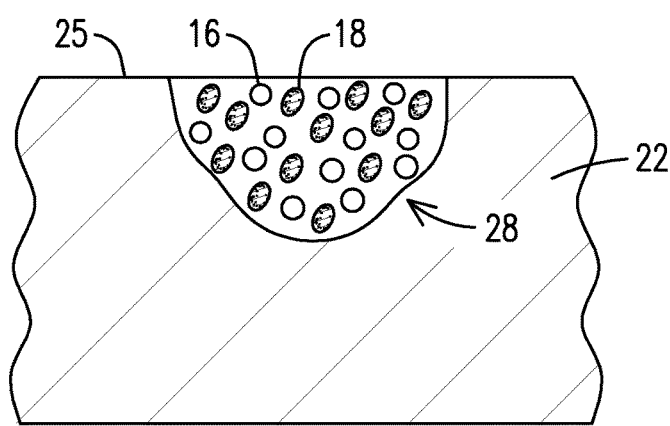

As mentioned, the melting of the substrate surface region 26 may be done prior to subjecting the braze material 10 to an energy source sufficient to melt the braze material 10 (but not carbon structures 18). In another embodiment, the melting of the substrate surface layer 26 may be done substantially simultaneously (at or about the same time) as the melting of the braze material 10, such as by adjusting the laser pulse duration and spatial focusing accordingly when a laser is used. The extent and depth of the melted substrate surface region 26 is without limitation and may depend on the size and shape of the substrate 22, the extent of damage, the area to be joined, and/or the substrate material. In an embodiment, the depth of the surface layer 26 that is melted is 100 nm or less. In particular embodiments, when utilizing the braze material 10 to repair a defect in a substrate, the melted surface region 26 follows a contour of the natural defect surface 40 as shown in FIG. 6A. The latter structure can be obtained by adjusting the laser parameters to only melt a certain depth 41 of the natural defect surface 40. The resulting final braze structure 28 is shown in FIG. 6B. In an embodiment, the brazement 28 comprises a gradient of carbon structures as previously described herein. In addition, in certain embodiments, the melting of the substrate surface region 26 and/or brazing utilizing braze material 10 may be done in multiple stages to form a plurality of consecutively applied (brazement) layers (not shown). The latter process could be beneficial for larger flaws. However, it is understood that the present invention is not so limited.

Further, in any of the embodiments described herein, the substrate(s) (e.g., 12, 14, and/or 22) may be subjected to a thermal pretreatment, such by heating using any conventional heating technique. The pre-heating would result in a smaller difference in temperature between the substrate and braze material 10 during brazing, thereby improving the quality of the brazement, improving melting, and reducing the duration of the brazing process. In an embodiment, the pre-heating is done at a temperature of at least 250° C. for a time period of at least 10 minutes under suitable brazing conditions.

With or without the melting of surface region 26, brazing is carried out for a time and a temperature sufficient to melt at least the braze fillers 16 of the braze material 10, but not the carbon structures 18. In one embodiment, the brazing temperature is greater than a melting point of the braze material 10. The brazing temperature is typically less than a liquidous temperature of the base substrate, but the present invention is not so limited as described above where a surface region of the substrate(s) is intentionally melted. In a particular embodiment, the brazing temperature is at least about 100° C. greater than a melting point of the braze material 10. Advantageously, a brazing heat treatment may be selected to be the same treatment as, or may be selected to incorporate, an established manufacturing solution heat treatment, a pre-weld heat treatment, a post-weld heat treatment, and/or a rejuvenating heat treatment. For example, the materials and methods described herein may be utilized to enhance the interface zone between a base component and a weld seam in a welding environment.

In an embodiment, the brazing is done by a laser brazing technique as is known in the art. Brazing that utilizes a laser beam in general is known from U.S. Pat. No. 5,902,498, the entirety of which is incorporated by reference. Advantageously, laser brazing allows for localized treatment of the substrate materials so that the complete object need not be subjected to brazing conditions. Alternatively, the brazing may be carried out utilizing any known brazing technique. Preferably, the brazing is done in an inert environment to eliminate the need for flux powders, or the like. Alternatively, flux agents may be added to the braze material 10 as are known in the art.

Aspects of the present invention may be used for the enhancement of a substrate, for the joining of two surfaces, or for any other application where a brazing process would be advantageous. In addition, the above-described material and processes may be useful in the original manufacture of gas turbine parts such as vanes, ring segments and combustor transition pieces, for example. The materials and processes described herein are further not limited to brazing techniques, but may be utilized with other joining techniques, such as welding.

While various embodiments of the present invention have been shown and described herein, it will be obvious that such embodiments are provided by way of example only. Numerous variations, changes, and substitutions may be made without departing from the invention herein. Accordingly, it is intended that the invention be limited only by the spirit and scope of the appended claims.

The invention claimed is:

1. A method for a brazement with a plurality of carbon structures, comprising:
    melting a surface region of a substrate; contacting a braze material with the melted surface region, the braze material comprising a plurality of braze fillers and the plurality of carbon structures;
    subjecting the braze material to an amount of energy effective to melt the braze fillers but not the carbon structures; and
    cooling the braze material and melted substrate material of the surface region to form a solidification comprising the carbon structures nonhomogeneously dispersed within at least a portion of the braze material;
    wherein the solidification comprises a gradient of the carbon structures in which a concentration of the carbon structures within the braze material increases in a direction away from an interior of the substrate.

2. The method of claim 1, wherein the melted surface region follows a contour of a natural defect surface on the substrate.

3. The method of claim 1, wherein the melted surface region has a depth of 100 nm or less.

4. The method of claim 1, wherein the carbon structures comprise a nanoyarn.

5. The method of claim 1, wherein the melting and the subjecting are done by the application of laser energy.

6. The method of claim 5, wherein the melting is done prior to the subjecting of the braze material to the energy.

7. The method of claim 1, wherein the melting is done simultaneously with the subjecting of the braze material to the energy.

8. The method of claim 1, wherein the substrate is a first substrate, and wherein the method further comprises:
    melting at least a portion of a surface region of a second substrate;
    contacting the braze material with melted substrate material of the surface region of the second substrate; and
    joining the first substrate to the second substrate.

9. The method of claim 1, wherein the substrate comprises a single crystal superalloy.

10. A method for a brazement with a plurality of carbon structures, comprising:
    contacting a braze material with a surface of a single crystal superalloy substrate, the braze material comprising a plurality of braze fillers and the plurality of carbon structures;

melting a surface region of the substrate;
subjecting the braze material to an amount of energy effective to melt the braze material but not the carbon structures; and
cooling the braze material and melted substrate material of the surface region to form a solidification on the single crystal superalloy substrate comprising the carbon structures,
wherein solidified braze material within the solidification comprises a nonhomogenous distribution of the carbon structures within the braze material.

11. The method of claim 10, wherein the carbon structures comprise a nanoyarn.

12. The method of claim 10, wherein the subjecting is done by a laser.

13. The method of claim 10, wherein the melting is done simultaneously with the subjecting of the braze material to the energy.

14. The method of claim 10, wherein the carbon structures comprise first carbon structures of a first dimension and second carbon structures of a second dimension smaller than the first dimension.

15. A method for a brazement with a plurality of carbon structures, comprising:

contacting a braze material with a surface of a titanium-based substrate, the braze material comprising a plurality of braze fillers and the plurality of carbon structures;
melting a surface region of the titanium-based substrate;
subjecting the braze material to an amount of energy effective to melt the braze material but not the carbon structures; and
cooling the braze material and melted substrate material of the surface region to form a solidification on the titanium-based substrate comprising the carbon structures,
wherein solidified braze material within the solidification comprises a nonhomogenous distribution of the carbon structures within the braze material.

16. The method of claim 15, wherein the carbon structures comprise a nanoyarn.

17. The method of claim 14, wherein the first dimension is greater than 1 micron and the second dimension is 1 micron or less.

18. The method of claim 1, wherein the plurality of carbon structures comprises graphene structures.

19. The method of claim 10, wherein solidified substrate material within the solidification comprises carbon structures.

* * * * *